(12) United States Patent
Shigeta

(10) Patent No.: US 11,688,235 B2
(45) Date of Patent: Jun. 27, 2023

(54) GAME SYSTEM FOR GAMING CHIP STACK IDENTIFICATION

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 2 days.

(21) Appl. No.: 17/097,186

(22) Filed: Nov. 13, 2020

(65) Prior Publication Data
US 2021/0150853 A1 May 20, 2021

(30) Foreign Application Priority Data
Nov. 14, 2019 (JP) .............................. JP2019-206359

(51) Int. Cl.
| G07F 17/00 | (2006.01) |
| G07F 19/00 | (2006.01) |
| G07F 17/32 | (2006.01) |
| G06V 20/00 | (2022.01) |

(Continued)

(52) U.S. Cl.
CPC .......... *G07F 17/3237* (2013.01); *G06V 20/00* (2022.01); *G06V 40/107* (2022.01); *G06V 40/172* (2022.01); *G07F 17/322* (2013.01); *G07F 17/3232* (2013.01); *G07F 17/3248* (2013.01); *G07F 17/3288* (2013.01)

(58) Field of Classification Search
CPC .............. G07F 17/3206; G07F 17/322; G07F 17/3232; G07F 17/3239; G07F 17/3248; G07F 17/3251; G07F 17/3288; G07F 17/3293; A63F 2001/001; A63F 1/067
See application file for complete search history.

(56) References Cited

U.S. PATENT DOCUMENTS

| 2002/0045478 A1* | 4/2002 | Soltys ................ G06Q 10/0639 463/29 |
| 2006/0177109 A1 | 8/2006 | Storch |
| 2008/0180250 A1 | 7/2008 | Steil |

(Continued)

FOREIGN PATENT DOCUMENTS

| EP | 3422307 A1 | 2/2019 |
| JP | 2015157114 A | 9/2015 |

(Continued)

OTHER PUBLICATIONS

European Search Report dated Apr. 6, 2021 issued in EP Application 20207166.8 cites the patent documents above.

(Continued)

*Primary Examiner* — Milap Shah
(74) *Attorney, Agent, or Firm* — Norton Rose Fulbright US LLP

(57) ABSTRACT

The game system of the present disclosure comprises a game table having a betting area in which a plurality of betting targets are laid out, a camera that captures the game table and generates a captured image, and an information processing device that identifies which betting target the stack is bet on, wherein when a plurality of stacks of the gaming chips are bet on the same betting area, the information processing device, based on the captured image, determines which stack is the stack of main player and which stack is the stack of back-betting player.

10 Claims, 11 Drawing Sheets

(51) Int. Cl.
  *G06V 40/10* (2022.01)
  *G06V 40/16* (2022.01)

(56) References Cited

U.S. PATENT DOCUMENTS

| | | | |
|---|---|---|---|
| 2009/0124379 A1 | 5/2009 | Wells | |
| 2012/0252564 A1* | 10/2012 | Moore | A63F 3/00157 463/25 |
| 2018/0247134 A1* | 8/2018 | Bulzacki | G06K 9/6282 |
| 2019/0005767 A1* | 1/2019 | Shigeta | G07F 17/3206 |
| 2019/0073855 A1* | 3/2019 | Moore | A63F 1/00 |
| 2019/0108710 A1 | 4/2019 | French et al. | |
| 2019/0236891 A1 | 8/2019 | Shigeta | |
| 2019/0259238 A1 | 8/2019 | Shigeta | |
| 2019/0266832 A1 | 8/2019 | Shigeta | |
| 2019/0347893 A1* | 11/2019 | Shigeta | G07F 17/3276 |
| 2019/0392680 A1* | 12/2019 | Shigeta | G07F 17/3206 |
| 2021/0056804 A1* | 2/2021 | Eager | G07F 17/3234 |
| 2021/0090379 A1* | 3/2021 | Takine | G06K 7/10475 |
| 2021/0233355 A1* | 7/2021 | Shigeta | H05K 7/1489 |
| 2021/0304550 A1* | 9/2021 | Kelly | A63F 13/00 |
| 2022/0207273 A1* | 6/2022 | Wu | G06V 10/761 |

FOREIGN PATENT DOCUMENTS

| | | |
|---|---|---|
| JP | 2019130299 A | 8/2019 |
| JP | 2019141577 A | 8/2019 |
| JP | 2019149155 A | 9/2019 |

OTHER PUBLICATIONS

International Search Report dated Jan. 19, 2021 issued in PCT Application PCT/JP2020/040449 cites the patent above documents.

* cited by examiner

GAME SYSTEM FOR GAMING CHIP STACK IDENTIFICATION

CROSS REFERENCE TO RELATED APPLICATION

This application claims priority under 35 U.S.C. § 119 to JP Application No. 2019-206359 filed Nov. 14, 2019, the content of which is hereby incorporated by reference herein in its entirety.

TECHNICAL FIELD

The present disclosure relates to a game system used for a game played by placing a gaming chip on one of a plurality of betting targets laid out on a table.

BACKGROUND ART

Conventionally, there is known a system which, at a table where a game is played by placing gaming chips on one of the betting targets laid out on the table, captures the gaming chips on the table with a camera to obtain an image, then analyzes the image by an image analyzing device and identifies a betting target on which the gaming chips are placed and the type and number of the gaming chip to determine how much gaming chips have been bet on which betting target.

A plurality of play positions are provided on the table so that a plurality of players can play at the same time. On the table, a betting area is provided for each play position. In each betting area, a plurality of betting targets are laid out. A player playing in a play position places a gaming chip on one of the plurality of betting targets laid out in the betting area allocated to his/her play position to bet the gaming chips on the betting target. When a plurality of gaming chips are bet on a betting target, the plurality of gaming chips are stacked and placed on the betting target to form a single stack.

Therefore, by designing the image analyzing device in consideration of the fact that the betting area is divided for each play position in this manner, it is possible to determine which betting target and how many gaming chips have been bet on each play position. For example, in a table for a baccarat game, at least "PLAYER" and "BANKER" are provided as multiple types of betting targets for each play position. The game system can determine whether a player in each play position has bet on "PLAYER" or "BANKER" and also how much the bet amount is by analyzing the image taken (e.g., JP2019-149155A).

In addition to this system, a player identification system for identifying players can be used to determine which player has bet how much gaming chips on which betting target. In addition thereto, by using the game result determination system for determining the outcome of the game, it is possible to determine which player has bet how many gaming chips, how many gaming chips have been redeemed, and how many gaming chips have been collected by dealer.

SUMMARY

Even if a table has more than one play position, it does not necessarily mean that the player must be in one of the play positions to play the game. In particular, when all the available play positions are already in use, a player who is not in a play position may participate in the game by placing his or her gaming chips in the betting area allocated to a player playing in a play position (hereinafter referred to as the "main player"). Thus, when a player who is not in a play position bets on a betting target in one of the betting areas allocated to the player in the play position, this is referred to as "back-betting", and the player who does back-betting is referred to as the "back-betting player".

Such back-betting results in multiple players betting gaming chips on multiple betting targets in one betting area of the plurality of betting area which is divided for each play position, therefore results in multiple stacks of gaming chips will be present on the same betting target or multiple betting targets different from each other in one bet area. In conventional systems, in such cases, it is difficult to determine which of the multiple stacks of gaming chips placed in the same betting area is the main player's stack and which stack is the back-betting player's stack.

Therefore, the present disclosure is to provide a game system that can determine which stack of gaming chips placed by a plurality of players on the same betting area is the stack placed by which player.

The game system of one aspect of the invention comprises: a table having a betting area in which multiple types of betting targets are placed; a camera that captures the table to generate an image; and an information processing device that is configured to identify on which of the betting target a stack of gaming chips is being bet on, based on a position of the stack of gaming chips in the image, wherein the information processing device is configured to determine which stack is main player's stack and which stack is back-betting player's stack based on the image when a plurality of stacks of gaming chips are being bet on the same betting area.

This configuration makes it possible to determine which stack is the main player's stack and which stack is the back-betting player's stack, even if multiple stacks of gaming chips are bet on the same betting area.

In the above game system, the information processing device may be configured to determine which stack is the main player's stack and which stack is the back-betting player's stack based on positional relationships of the plurality of stacks betting on the same betting area with respect to each other.

With this configuration, even if multiple stacks of gaming chips are bet on the same betting area, it is possible to determine which stack is the main player's stack and which stack is the back-betting player's stack based on the relative positions of those stacks. For example, if a game is played with a rule that a back bet should be placed to the right of a main bet, the system can determine that the left stack is the main player's stack and the right stack is the back-betting player's stack.

In the above game system, the information processing device may be configured to determine which stack is the main player's stack and which stack is the back-betting player's stack based on a positional relationship between the stack and the betting target on which the stack is bet.

This configuration makes it possible to determine which stack is which player's stack based on where the stack is placed on the betting target. For example, if a game is played under a rule set by the casino that the main bet should be placed in the center and left of the betting target, and the back bet should be placed on the right side of the betting target, the system can determine that the stack placed in the center or left of the betting target is the main betting player's stacks, and the stack placed on the right side of the betting target is the stacks of the back-betting player's stack. Furthermore, even if no back-betting player bet a stack and there is only a stack within the betting target that is bet by the main player only, it will be possible to determine that the stack is the main player's stack based on the position at which the stack is placed.

In the above game system, the camera may capture a player betting a stack of gaming chips, and the information processing device may be configured to recognize in the image each player who has bet the stack on the same betting area, and based on the recognition results, determine which stack is the main player's stack and which stack is the back-betting player's stack.

With this configuration, it is possible to recognize the player who bet the stack, whereby it is possible to determine which player is the main player, which player is the back-betting player, and also which stack is the main player's, which stack is the back-betting player's.

In the above game system, the information processing device may be configured to recognize in the image a body part or clothing part of the each player who has bet the stack on the same betting area, and based on the results of recognition of the body part or clothing part, determine which stack is the main player's stack and wherein it is determined which stack is the back-betting player's stack.

With this configuration, even if the casino does not set the rules for where the stack should be bet on, and the game is played such that the player is free to bet the stack anywhere in a betting target, the system can still identify which stack belongs to which player based on a body part or clothing part recognized from the captured image.

In the above game system, the information processing device may be configured to identify which body part or clothing part of the recognized body part or clothing part is a body part or clothing part of either player, and based on the identification result, determine which stack is the main player's stack and which stack is the back-betting player's stack.

With this configuration, it is possible to recognize which body part or clothing part belongs to which player, and then to determine which body part or clothing part has been bet which stack.

In the above game system, the information processing device may be configured to determine a direction of the recognized body part or clothing part, and based on the result of the determination, determine which stack is the main player's stack and which stack is the back-betting player's stack.

With this configuration, it is possible to determine which stack belongs to which player, for example, from the direction of the extension of the body part or clothing betting the stack, even if it is difficult to recognize the faces of the main player and the back-betting player, or to recognize the body part or clothing.

In the above game system, the information processing device may be configured to determine whether the plurality of stacks bet on the same betting area are stacks of the same player based on the image.

With this configuration, it is possible to determine which stack belongs to which player, even if, for example, one player is betting on more than one stack because of a large betting amount, or if more than one player respectively bet a stack.

In the above game system, the information processing device may be configured to determine whether the plurality of stacks are stacks of the same player based on a distance of the plurality of stacks.

With this configuration, it is possible to determine, for example, if the distance between the stacks is close, they are bets made by the same player, and if the distance between the stacks is far, they are bets made by more than one player.

In the above game system, the information processing device may be configured to determine which stack is the main player's stack and which stack is the back-betting player's stack based on a plurality of the images obtained in chronological order.

With this configuration, it is possible to distinguish which stack belongs to which player, not only from a single image captured, but also from multiple images obtained in chronological order, i.e., video.

In the above game system, the information processing device may be configured to determine which stack is a main player's stack and which stack is a back-betting player's stack based on an order in which the plurality of stacks bet on the same betting area were bet.

With this configuration, for example, if the casino has a rule that the main player should bet first and the back-betting player should bet later, the system can determine that the first stack bet is the main player's and the last stack bet is the back-betting player's.

According to the present disclosure, it is possible to determine which stack is the main player's stack and which stack is the back-betting player's stack, even if a plurality of stacks of gaming chips are bet on the same betting area.

DESCRIPTION OF PREFERRED EMBODIMENTS

The game system of this invention will be described in detail with reference to the drawings. In the following embodiments, a game system for baccarat will be illustrated as a game system, but the invention is not limited by this embodiment. The components in the following embodiments include those that can be readily assumed by those skilled in the art or are substantially the same.

Figure 1:
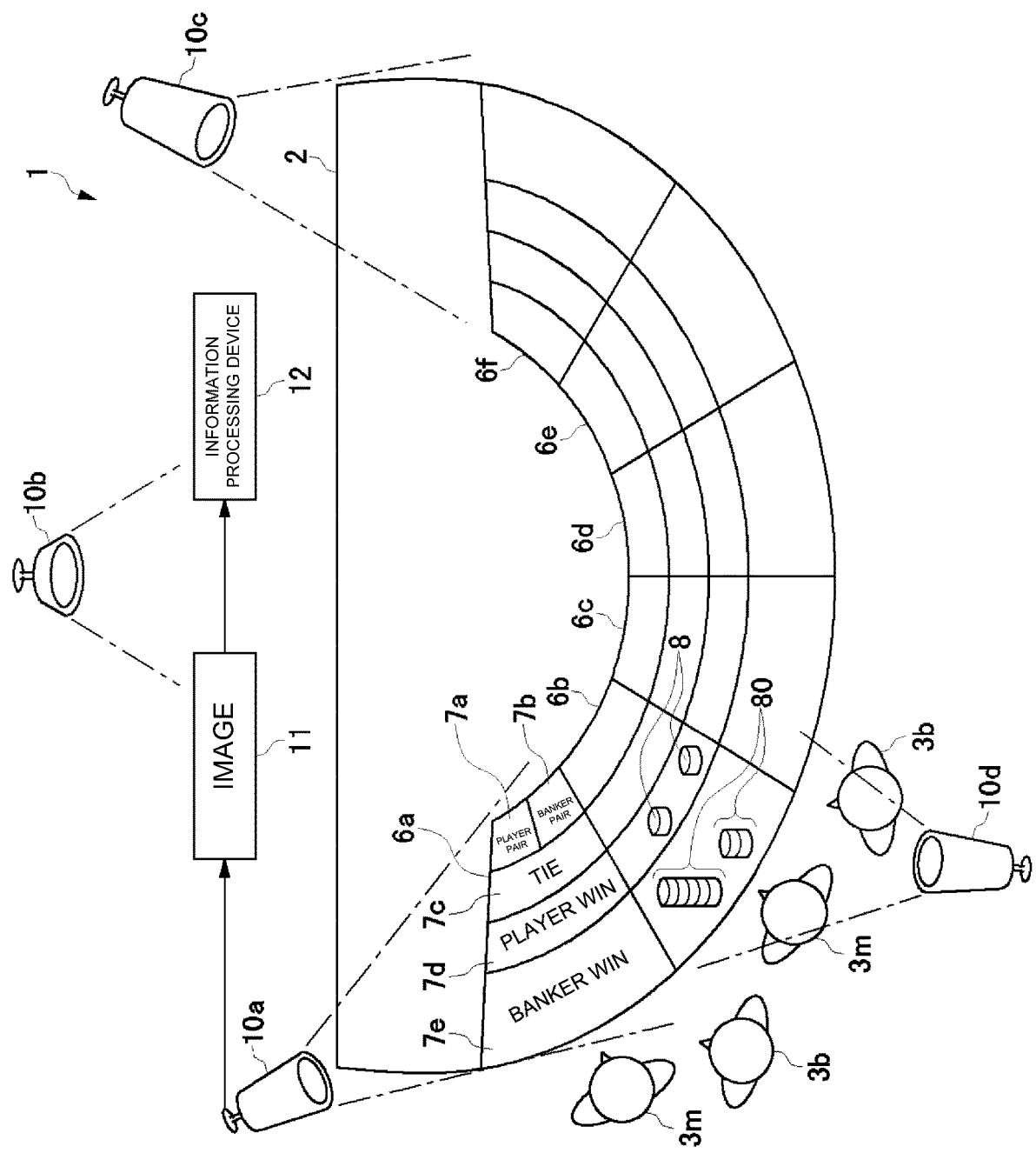
FIG. 1 illustrates a configuration of a game system of the first example of the present disclosure.

FIG. 1 illustrates the configuration of a game system of a first example of an embodiment of the present disclosure. The game system 1 is provided with a game table 2 of an approximate oval shape. On one side of the game table 2 (the lower side of FIG. 1), a main player 3m and a back-betting player 3*b* (hereinafter, the main player 3*m* and the back-betting player 3*b* together are also referred to as "player 3") are located on one side of the game table 2, and the dealer (figure omitted) is located on the opposite side. On the top surface of the game table 2, a plurality of betting areas 6*a* to 6*f* (hereinafter collectively referred to as "betting areas 6") are compartmentalized for each of a plurality of play positions. In addition, a plurality of betting targets are laid out in each of the betting area 6. In each betting area 6, PLAYER PAIR area 7*a*, BANKER PAIR area 7*b*, TIE area 7*c*, PLAYER WIN area 7*d* and BANKER WIN area 7*e* are laid out as betting targets 7. Main player 3*m* and back-betting player 3*b* participate in the game by placing a gaming chip 8 on one of the betting targets 7 laid out in betting area 6, and betting gaming chip 8 on betting target 7. The gaming chips 8 to be bet may be one or more gaming chips 8. In the case of betting more than one gaming chip 81, the gaming chips 8 are stacked to form a pile of one or more gaming chips 8. This pile of gaming chips 8 is hereafter referred to as a stack 80. The stack 80 may comprise one gaming chip 8.

The game system 1 is equipped with a camera 10, wherein the camera 10 captures the betting area 6 and generates a captured image 11. Further, the game system 1 is equipped with an information processing device 12, wherein the information processing device 12 determines, based on the captured image 11, whether the stack 80 is a stack bet by the main player 3*m* (hereinafter referred to as "main bet") or a stack bet by the back-betting player 3*b* (hereinafter referred to as "back bet"). Alternatively, the information processing device 12 may identify the location of the stack 80 of gaming chips 8 placed on the betting target 7 without determining whether it is a main bet or a back bet.

For purposes of explanation, four cameras 10*a*-10*d* are illustrated in FIG. 1 for convenience, but the number or location of the cameras 10 may be any number or location that can adequately capture the betting area 6 and the stack 80 placed therein. The camera 10*b* takes an image of the betting area 6 of the gaming table 2 and the gaming chips 8 placed thereon from directly above the gaming table 2. Although only the surface of the topmost gaming chip 8 of the stack 80 can be observed in the image of the camera 10*b*, the location of the stack 80 can be determined more easily than in the image of the other cameras 10.

Figure 2:
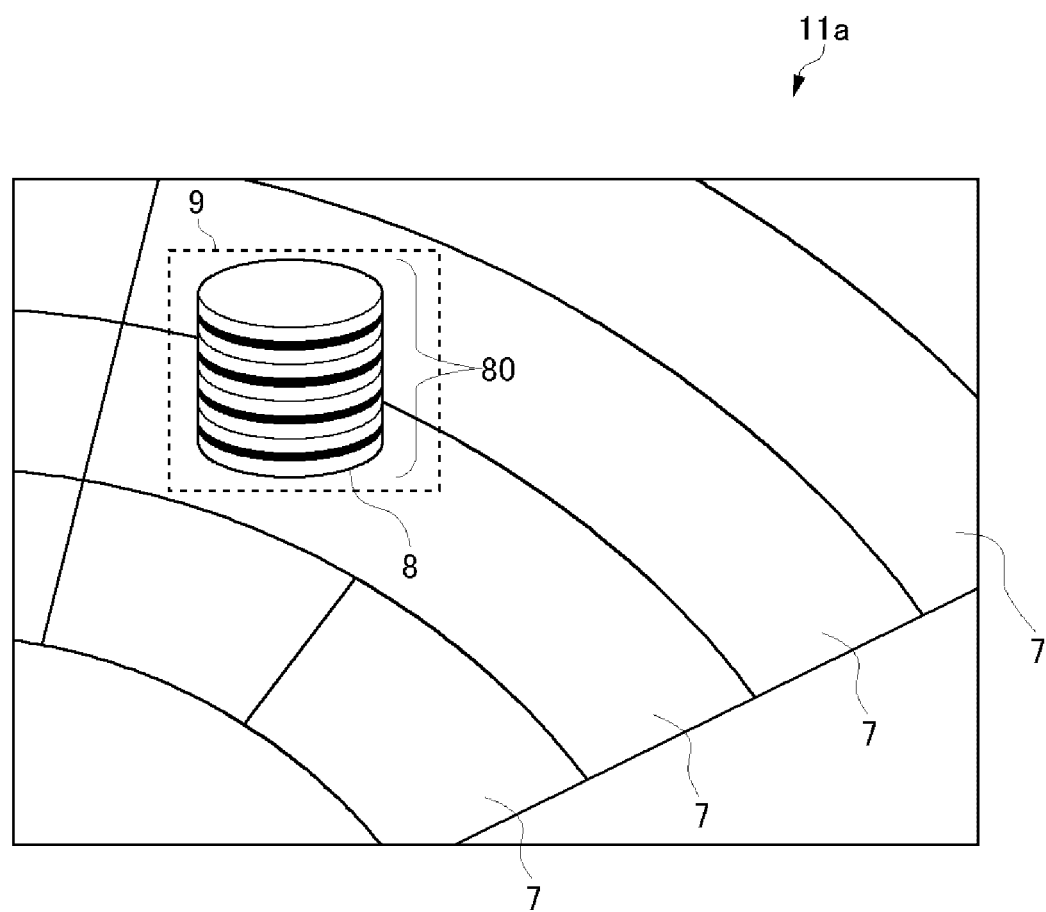
FIG. 2 illustrates a captured image of the first example generated by a camera photographing a betting area.

FIG. 2 illustrates a captured image 11*a* of a first example generated by the camera 10 taking a picture of the betting area 6. The method of recognizing the stack 80 in the information processing device 12 will be described here using FIG. 2. The captured image 11*a* shown in FIG. 2 comprises a plurality of pixels arranged in two-dimensional coordinates.

As an assumption, the gaming chip 8 is at least partially imparted with a color. The color may be a layer of the gaming chip 8, applied circumferentially on the sides of the gaming chip 8, or as a predetermined mark on the surface of the gaming chip 8. FIG. 2 illustrates an example of a color attached circumferentially to a side of the gaming chip 8. The color represents a type (value) of the gaming chip 8. In other words, the gaming chip 8 is given a color according to the type (value) of the gaming chip 8.

The information processing device 12 detects the stack 80 from within the image using a neural network that has been trained to detect the stack 80. Specifically, the information processing device 12 detects a rectangular region 9 (bounding box) including the stack 80 from within the image (object detection) or extracts a region of the stack 80 (hereinafter referred to as the "stack region")(region segmentation).

The information processing device 12 extracts a region in which the partially assigned color is presented, and determines the type of each gaming chip 8 based on the partially assigned color of each gaming chip 8 in the detected stack 80. This determination may be made using template matching or a machine learning model such as a neural network. The two of them may be used in combination, or each of them may be used to make a stepwise determination.

Further, the information processing device 12 may recognize the stack 80 or the type of gaming chip 8 that forms the stack 80 by a method of measuring features on the image such as shape, brightness, saturation, tint, etc., based on the image analysis to the captured image 11, without using an artificial intelligence device.

Figure 3:
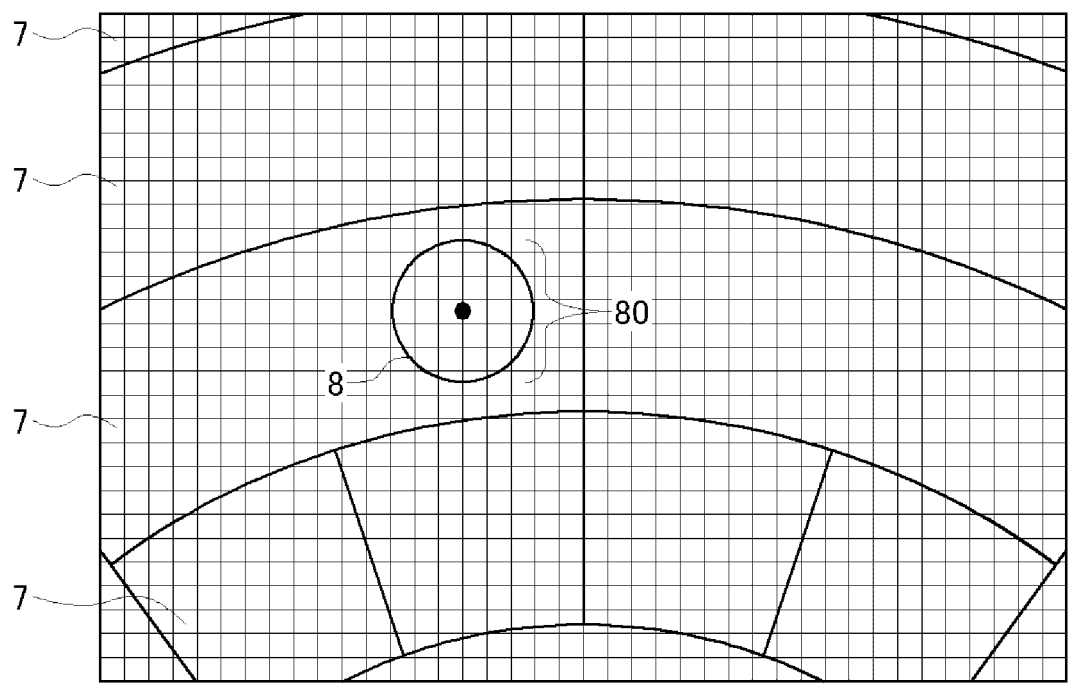
FIG. 3 illustrates a portion of the image captured by the camera directly above the game table.

Next, the method of recognizing which betting target 7 the stack 80 is placed on will be described. FIG. 3 shows a portion of an image taken by the camera 10*b* directly above the gaming table 2. In this image, the topmost gaming chip 8 of the stack 80 is observed in a circular shape. The information processing device 12 defines a two-dimensional arranged grid for this image, and for each grid, which betting target 7 the grid in question corresponds to. The information processing device 12 detects the stack 80 from the image and determines in which grid the detected stack 80 (specifically, the center of the topmost gaming chip 8 of the stack 80) is located, thereby determining in which betting target 7 the stack 80 is placed. Based on the captured image shown in FIG. 3, it is also possible to determine in which grid the stack 80 is located, thereby determining in which position in the betting target 7 the stack 80 is placed.

When the information processing device 12 determines on which betting target 7 the stack 80 is placed based on the captured image 11*a* shown in FIG. 2, the information processing device 12 does as follows. That is, when using a captured image obtained from an oblique upward angle, such as the captured image 11*a* in FIG. 2, the information processing device 12 determines, according to the coordinate value of a pixel (i.e., the position in the captured image) at the center of a bottom edge of the detected rectangular region 9 or the lowest point in the center of the maximum left and right width of the extracted stack region, the position where the stack 80 is located (i.e., the betting target 7 or the position within the betting target 7).

Alternatively, in determining the position where the stack 80 is located (i.e., the betting target 7 or the position within the betting target 7) from the captured image 11*a* shown in FIG. 2, the information processing device 12 may determine that the stack 80 exists at the coordinates of the center of the left and right directions of the color circumferentially attached to the side of the bottom gaming chip 8. Alternatively, the position of the stack 80 may be determined by estimating the overall shape of the gaming chip 8 from the arc shape of the color arc attached in the circumferential direction and identifying the coordinates of the center of the gaming chip 8 from the overall shape.

The information processing device 12 stores which coordinates correspond to which betting target 7, and the information stored is compared with the coordinates indicating the center of the gaming chip 8 determined from the captured image 11*a* to recognize on which betting target 7 the stack 80 is placed. The information processing device 12 may also detect or extract each betting target 7 from the captured image using a machine learning model such as a neural network to determine the betting target 7 on which the stack 80 is placed by detecting or extracting each betting target 7 from the captured image.

The information processing device 12 may recognize the center of the topmost chip and the number of gaming chips 8 in the stack 80, estimate the position of the center of the lowermost gaming chip in the stack 80 based on the number of gaming chips in the stack 80, and determine the estimated position as the position of the stack 80. In this case, the information processing unit 12 calculates the position of the right angle of a right triangle as the position of the lowest gaming chip 8, i.e., the position of the stack 80, wherein the right triangle has a line segment connecting the camera 10 and the center of the topmost chip as the hypotenuse, has a height calculated from the number of gaming chips 8, and has the base set on the table surface.

The information processing device 12 converts the coordinates of each pixel of the image obtained from the camera 10 into a table coordinate system set on the table surface. This conversion formula is determined from the relationship between the table surface and the position and orientation of the cameras 10 and is known as long as the cameras 10 are fixed. By converting the positions of the stack 80 recognized in each of the images of the plurality of cameras 10 into a table coordinate system, the stack 80 captured by the plurality of cameras 10 can be treated in a unified manner.

The information processing device 12 has a map of the betting targets corresponding to the table coordinate system. The information processing device 12 determines in which betting target 7 the stack 80 is located by mapping the position (coordinates) of the stack 80 converted to the table coordinate system to the map in which the betting target 7 is set (a first map).

The information processing device 12 also has a map (a second map) that further divides some of the betting targets (e.g., TIE area 7c, PLAYER WIN area 7d, and BANKER WIN 7e, which are relatively large in area) into a plurality of subregions. The information processing device 12 determines in which sub-region of the betting target 7 the stack 80 is located by mapping the position (coordinates) of the stack converted to the table coordinate system to the second map. As such a second map, for example, TIE area 7c may be divided into three sub-regions in the longitudinal direction to define three sub-regions, and PLAYER WIN area 7d and BANKER WIN area 7e may be divided into four sub-regions by dividing PLAYER WIN area 7d and BANKER WIN area 7e respectively to define four sub-regions.

When the positions of the stack 80 obtained by a plurality of cameras 10, respectively, are converted to a table coordinate system, an error may occur between them. This error may be caused by a shift in the orientation and/or position of the cameras 10, an inaccurate conversion formula for the coordinate conversion, and/or an error in the recognition of the position of the stack 80. If the positions of the same stack 80 taken by the plurality of cameras 10 are misaligned when the positions of the same stack 80 taken by the plurality of cameras 10 are converted to the table coordinate system, respectively, the median of them may be regarded as the coordinates of the stack 80. If the distance in the table coordinate system of the stacks 80 captured by each of the plurality of cameras 10 is less than or equal to a predetermined threshold value, the information processing device 12 may consider those stacks 80 to be the same stack, and if the distance between them is greater than the threshold value, the information processing device 12 may consider them to be two different stacks.

In the above example, the information processing device 12 converted all of the positions of the stack 80 obtained from each of the plurality of cameras 10 to the same table coordinate system and then determined in which betting target or sub-region the stack 80 was placed, but instead of this, a map with a betting target or sub-region may be prepared, and the information processing device 12 may map the position of the stack 80 recognized in the image 11 captured by each camera to the map without a coordinate conversion to determine in which betting target or sub-region the recognized stack 80 is located.

Figure 4:
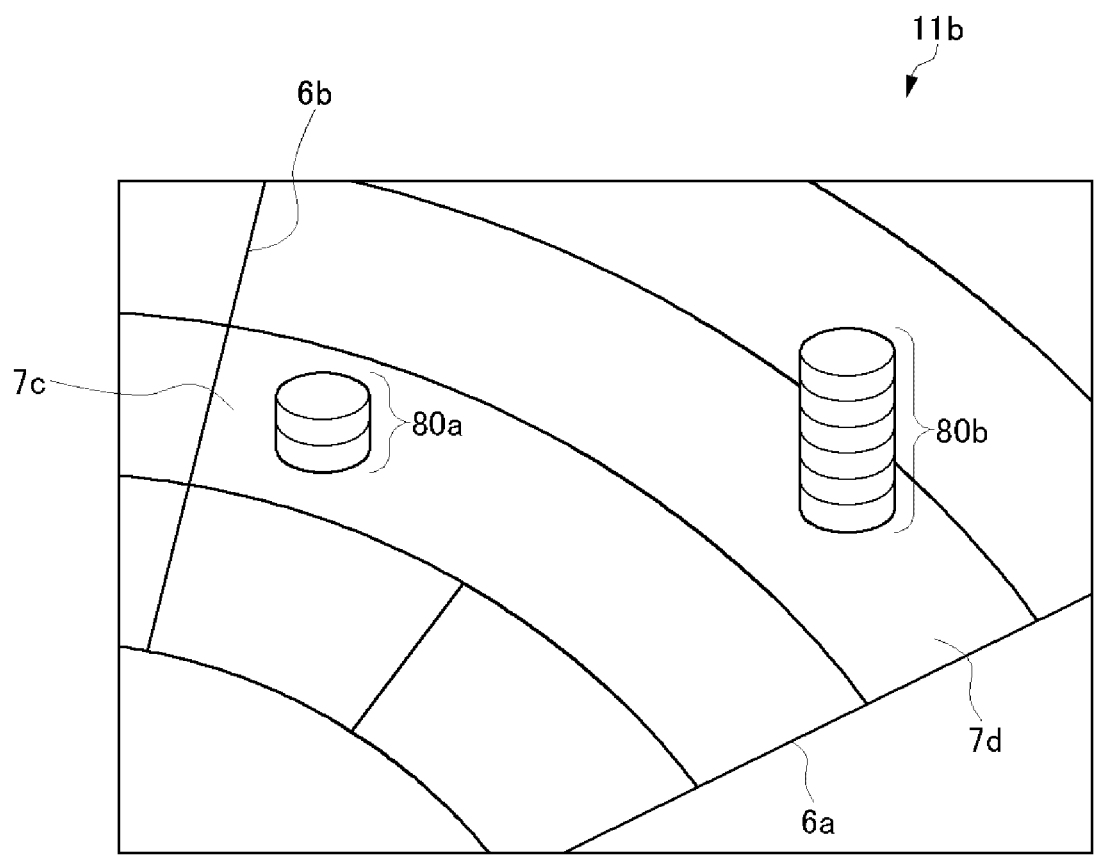
FIG. 4 illustrates an image of a second example taken by the camera taking a picture of the betting area.

FIG. 4 illustrates a second example of a captured image 11b generated by the camera 10 capturing the betting area 6. A portion of the betting area 6a and 6b is illustrated in the captured image 11b. The specific method of determination by the information processing device 12 will be described using FIGS. 1, 4 and 5.

There are two stacks 80a and 80b in betting area 6a in FIG. 4, with stack 80a placed in TIE area 7c and stack 80b in PLAYER WIN area 7d. Now suppose that the casino sets a rule that the back bet should be placed to the right of the main bet from the player to the dealer, and the game is played in accordance with that rule, and a captured image 11b is generated. In this case, the information processing device 12 determines, based on the captured image 11b, that a stack 80b placed in PLAYER WIN area 7d is placed on the left side and a stack 80a placed in TIE area 7c is placed on the right side of the stack 80b, and furthermore, based on the above rule, determines that 80b is the main bet and stack 80a is the back bet.

Based on the above rules, it is possible to determine whether each stack 80 is a main bet or a back bet, even when multiple stacks 80 are betting in the same betting area 6 by main player 3m and back-betting player 3b. The casino may set a rule that the main bet should be placed in the center and left side of the betting target 7 and the back bet is placed on the right side of the betting target 7.

Based on the above rules, if one or more stacks 80 that were bet by main player 3m are in the betting target 7 and no stacks bet by back-betting player 3b is in the betting target 7, the information processing device 12 can determine that the stack 80 belongs to main player 3m, and the information processing device 12 also can determine that the stack 80 belongs to the back-betting player 3b if one or more stacks 80 that were bet by the back-betting player 3b are in the betting target 7 and no stacks bet by the main player 3m is in the betting target 7.

In the above, only two examples of rules set by the casino were explained, but the rule is not necessarily limited to the above rules, and any rule may be set by the casino as long as it is capable of distinguishing between back-betting player 3b and main player 3m.

Figure 5:
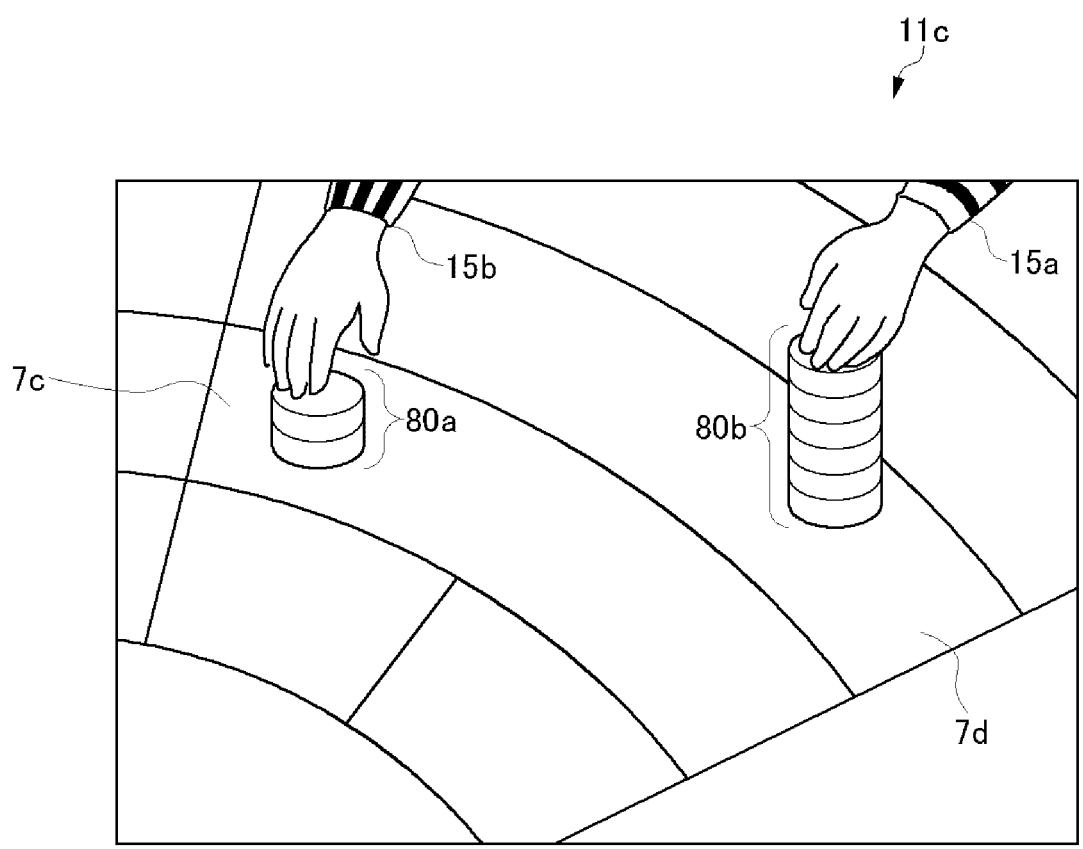
FIG. 5 illustrates an image of a third example taken of a third example generated by the camera taking a picture of a betting area.

FIG. 5 illustrates a third example of a captured image 11c generated by the camera 10 capturing the betting area 6. In addition to image 11b, a hand and part of an arm of main player 3m or a part of a sleeve of clothing (hereinafter simply referred to as "arm 15a") and a hand and part of an arm of back-betting player 3b (hereinafter simply referred to as "arm 15b") are shown in the image 11c (hereinafter the arm 15a and the arm 15b are collectively referred to as "arm 15"). The information processing device 12 is configured to recognize the arms 15 in the captured image 11c. Further, the information processing device 12 can identify whether each arm 15 is that of the main player 3m or that of the back-betting player 3b. Based on the results of the identification, the information processing device 12 determines whether each stack 80 placed in the betting area 6 belongs to the main player 3m or to the back-betting player 3b.

Here, the method of recognizing the arm 15 of the information processing device 12 will be described. The method of recognizing the region of the arm 15 from the captured image 11c is basically the same as the method of extracting the region of the gaming chip 8 described above. In the case of recognizing the gaming chip 8, a specific color attached to the gaming chip 8 is used as a reference, but in the case of recognizing the arm 15, the color or pattern of the clothing and the color of the arm are used as a reference.

The information processing device 12 captures the arms 15 of each player in advance and stores the captured images of each arm 15 in association with the information identifying the player concerned. The information processing device 12 identifies the main player 3m and the back-betting player 3b by the player identification system described below. When the information processing device 12 recognizes a first arm 15 in the captured image 11c, the information processing device 12 determines which arm 15 corresponds to the previously stored arm 15, and determines whether the arm 15 is an arm 15a of the main player 3m or an arm 15b of the back-betting player 3b by identifying which arm 15 corresponds to the previously stored arm 15.

The information processing device 12 may also recognize the arm 15 in the captured image 11c and determine whether the arm 15 belongs to the main player 3m or the back-betting player 3b based on the direction of the recognized arm 15 as well.

Figure 6:
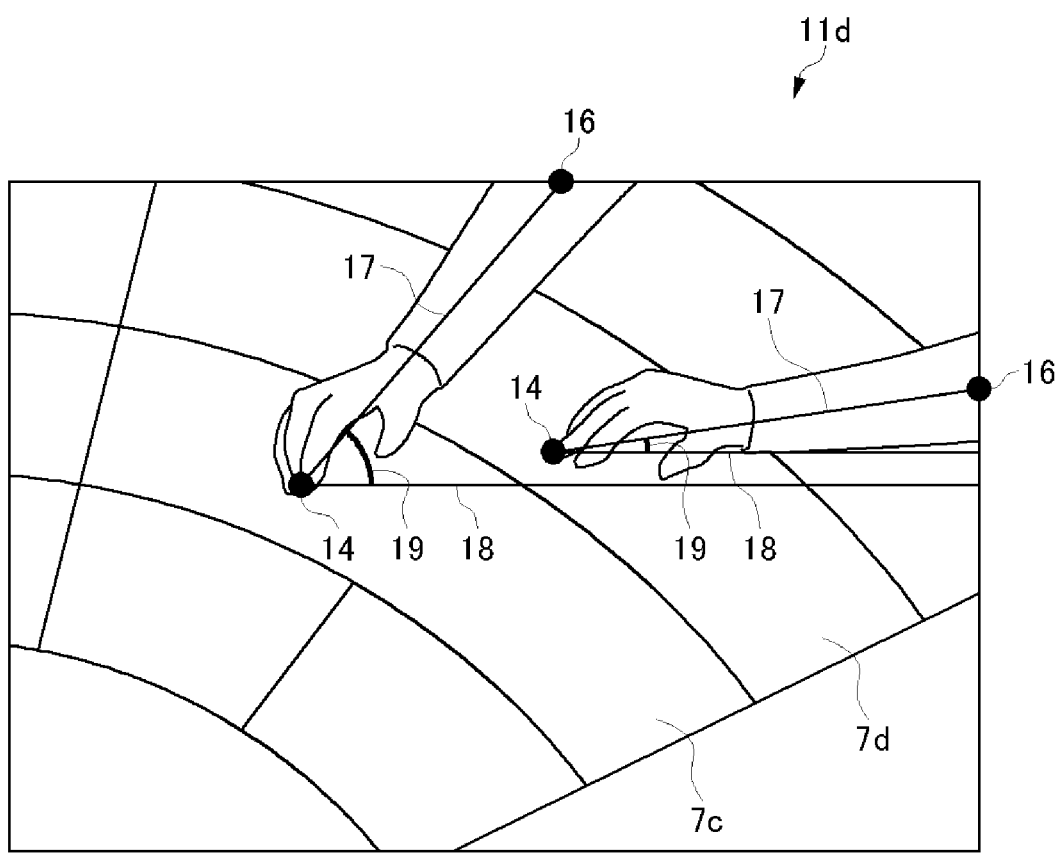
FIG. 6 illustrates a captured image of a fourth example generated by the camera photographing the betting area.

FIG. 6 illustrates a fourth example of an image 11d captured by the camera 10 capturing the betting area 6. The method of identification based on the direction of the arms is described using FIG. 6. The captured image 11d illustrates the respective arms 15 of the main player 3m and the back-betting player 3b. The information processing device 12 first identifies the tip 14 and the end 16 of the arm 15, and connects the two points with a straight line 17. It also connects the straight line 17 to a straight line 18 drawn horizontally through the tip 14. The angle 19 constituted by those two lines 17 and 18 is used as a criterion for identifying the player 3.

In the game, the back-betting player 3b plays in a standing position. Therefore, when the back-betting player 3b bets, he/she puts his/her arm 15b out at a high angle to the game table 2. The main player 3m, on the other hand, plays the game in a seated position. Therefore, when betting, he/she will put his/her arm 15a out from a low angle toward game table 2.

That is, the information processing device 12 identifies the arm 15 with a small angle 19 determined by the above method as the arm 15a of the main player 3m, and the arm 15 with a large angle 19 is the arm 15b of the back-betting player 3b. Further, it may be identified on the basis of otherwise.

In the above, the object to be recognized by the information processing device 12 in the captured image 11d was the arm 15. However, the object to be recognized does not have to be the arm 15 of the player 3, and it may be a part of the body or a part of the clothing, other than the arm.

As an example of recognizing a part of the body other than the arm, for example, the body of player 3 may be captured so that the body of player 3 is also included in the captured image 11. In that case, the body of the main player 3m sitting on the chair is recognized, and furthermore, the arm 15 coming out of that body is recognized. It further recognizes the stack 80 on which the arm 15 has bet, and identifies the stack 80 as belonging to the main player 3m. The same method is used to identify the back-betting player 3b.

Figure 7:
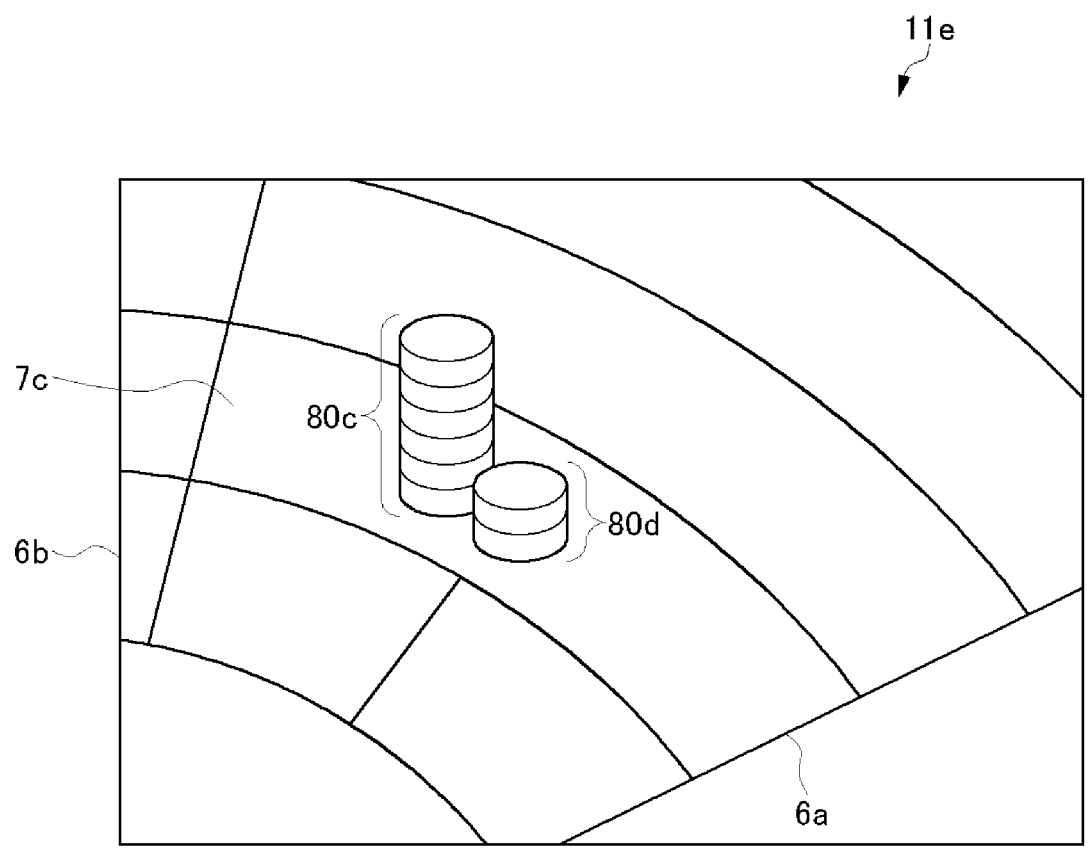
FIG. 7 illustrates a captured image of a fifth example generated by the camera photographing the betting area.

In betting gaming chips 8 by player 3 in a game, one player 3 may bet a plurality of stacks 80 of gaming chips 8 in a game. The game system 1 of the present example enables a determination of whether the plurality of stacks 80 belong to the same player 3 in such a case. FIG. 7 will be used to explain the following.

FIG. 7 illustrates a captured image 11e of a fifth example generated by the camera 10 capturing the betting area 6. The captured image 11e illustrates a portion of the betting areas 6a and 6b. There are two stacks 80c and 80d in betting area 6, and both stacks 80c and 80d are placed in TIE area 7c. The information processing device 12 measures the distance between the stacks 80c and 80d that are bet on the same betting target 7 based on the captured image 11e. This distance may be a distance in the captured image 11e or may be converted from the distance in the captured image 11e to a distance in real space. The information processing device 12 then determines whether the stacks 80c and 80d are stacks 80 of the same player 3 based on the obtained distance.

Figure 8:
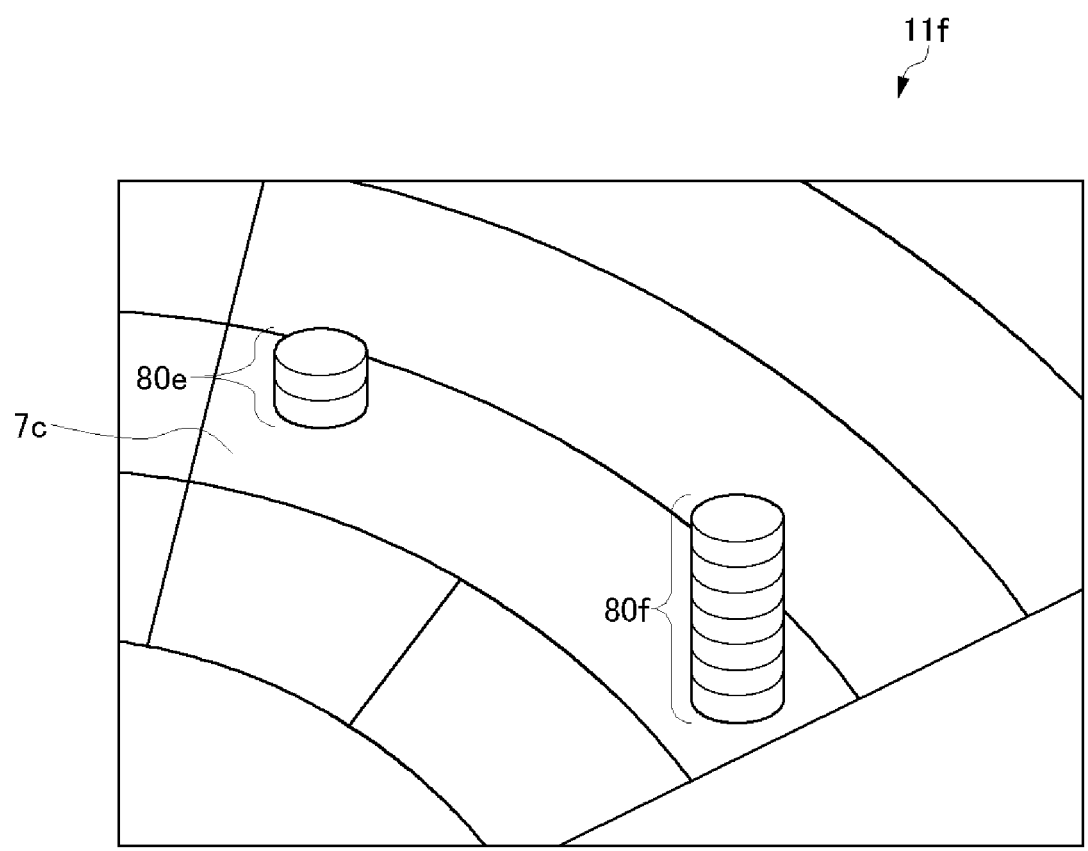
FIG. 8 illustrates a captured image of a sixth example generated by the camera photographing the betting area.

FIG. 8 illustrates a captured image 11f of a sixth example generated by the camera 10 capturing the betting area 6. The specific method of determination will be described using FIGS. 7 and 8. In FIG. 7, the two stacks 80c and 80d are placed in close proximity to each other. In this case, the information processing device 12 determines that the distance between the stacks 80c and 80d is less than a predetermined threshold, and determines that these two stacks 80c and 80d are the stacks 80 of the same player 3. On the other hand, in the captured image 11f of the sixth example in FIG. 8, the two stacks 80 are placed at a distance from each other. In this case, the information processing device 12 determines that the distance between the stacks 80e and 80f is greater than a predetermined threshold, and determines that these two stacks 80e and 80f are different stacks 80 of player 3. In other words, the information processing device 12 determines whether the plurality of stacks 80 are stacks 80 of the same player 3 based on the distance between the plurality of stacks 80. The distance between the stacks 80 that the information processing device 12 uses as a basis for the determination may be any distance.

Figure 9:
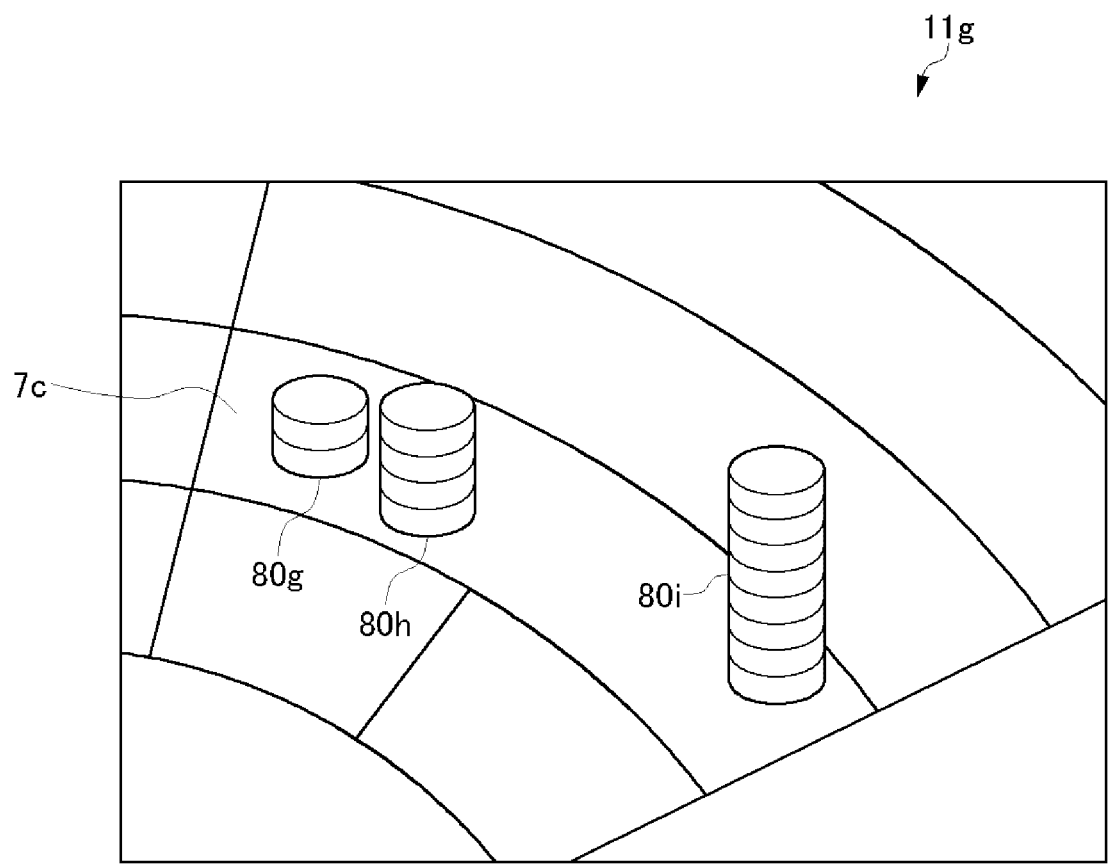
FIG. 9 illustrates a captured image of a seventh example generated by the camera photographing the betting area.

FIG. 9 illustrates a captured image 11g of a seventh example generated by the camera 10 capturing the betting area 6. FIG. 9 is used to illustrate the method of determining when three stacks 80 are bet on the same betting target 7. In FIG. 9, the three stacks are placed in the TIE area 7c. Stack 80g and stack 80h are placed in close proximity and stack 80i is placed remotely. In this case, the information processing device 12 uses the distances between the stacks 80g and 80h and between the stacks 80h and 80i as a basis for determining the distance between the stacks 80g and 80h and between the stacks 80h and 80i. In other words, the information processing device 12 determines that stack 80g and stack 80h have been bet by one player 3 and stack 80i by the other player 3. The distance that the information processing device 12 uses as a basis for the determination may be any distance.

Two stacks 80 are illustrated in FIGS. 7 and 8 and three stacks 80 are illustrated in FIG. 9, but there may be four or more stacks 80.

Although the determination by the information processing device 12 described above determined whether the plurality of stacks 80 were main bets or back bets based on each single captured image, the information processing device 12 may make the determination based on a plurality of captured images. The camera 10 provided in the game system 1 takes pictures of the betting area 6 at regular intervals to generate a captured image. The captured images can be obtained in chronological order. Thus, when a plurality of stacks 80 are placed on the same betting area 6, the information processing device 12 can also determine whether the plurality of stacks 80 are stacks 80 of the same player 3 based on the plurality of captured images obtained in a time series.

Figure 10:
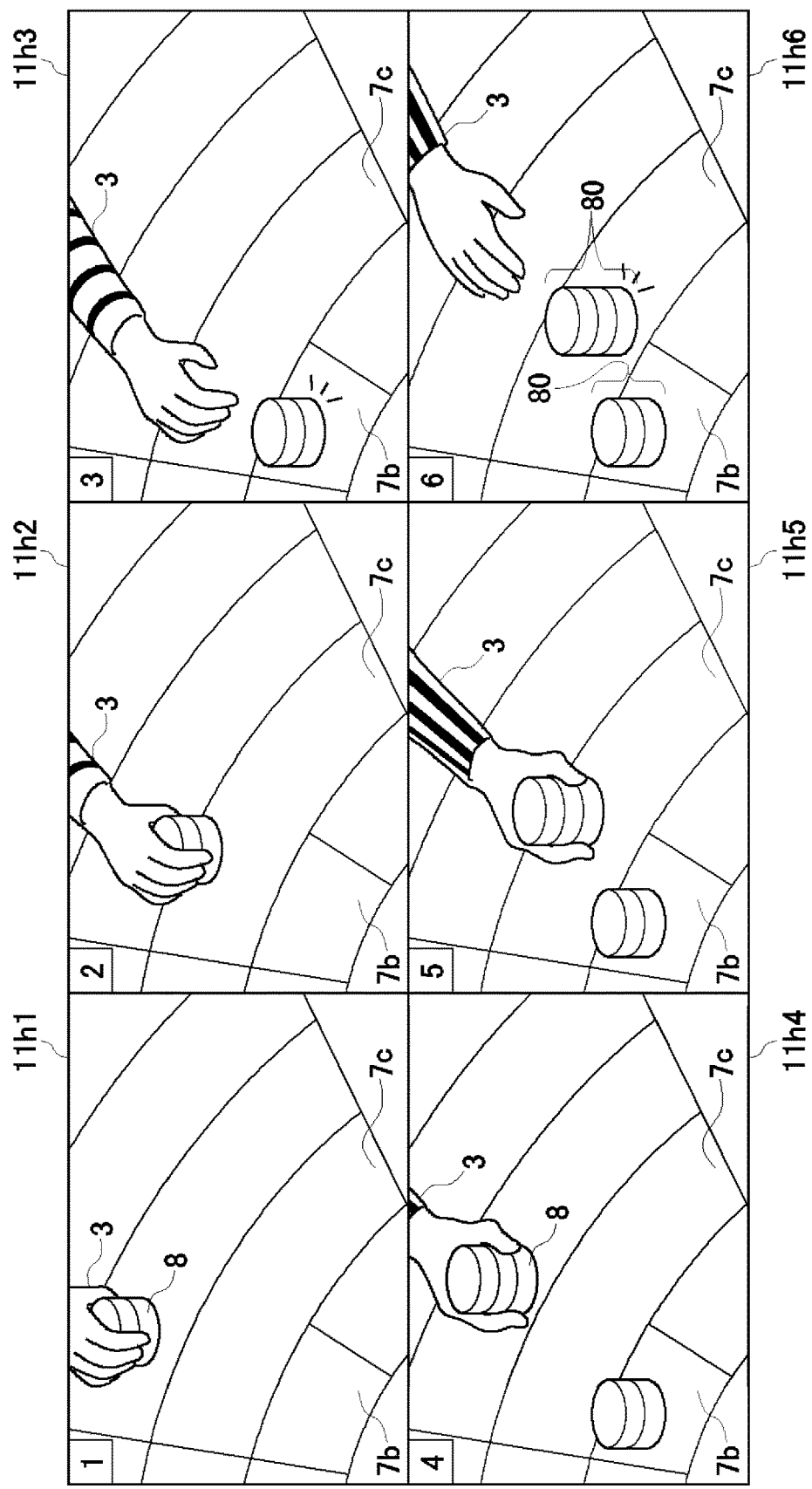
FIG. 10 illustrates six images taken in a chronological order.

FIG. 10 shows the six imaging images 11h1 to 11h6 obtained in chronological order from 1 to 6. A specific method for determining the image based on the plurality of captured images will be described using FIG. 10. The captured images 11h1 and 11h2 represent a first player 3 attempting to place a plurality of gaming chips 8 in the betting area 6. Captured image 11h3 represents the first player 3 placing a plurality of gaming chips 8 on the BANKER PAIR area 7b of the betting area 6 to bet on the BANKER PAIR area 7b. Captured images 11h4 and 11h5 represent the second player 3 attempting to place a plurality of gaming chips 8 in the betting area 6. Captured image 11h6 represents the second player 3 placing the plurality of gaming chips 8 on the TIE area 7c of the betting area 6 to bet on the TIE area 7c. The captured image 11h6 also represents the plurality of stacks 80 being present in the same betting area 6 including a stack 80 made by the first player 3 betting and a stack 80 made by the second player 3 betting.

For example, if the casino sets the rule that the back bet should be made after the main bet and the game is played, and six captured images 11h1 to 11h6 are obtained, the information processing device 12 will determine that the gaming chip 8 bet by the first player 3 is a stack 80 of the main player 3m and the gaming chip 8 bet by the second player 3 is a stack 80 of the back-betting player 3b.

In the above, one rule was mentioned, but any rule may be set by the casino as long as the rule is capable of distinguishing between the back-betting player 3b and the main player 3m.

The main player 3m and the back-betting player 3b may each bet more than one stack 80. In this case, if judging simply by the order of the bets, the second stack 80 bet by the main player 3m might be determined as a stack bet by the back-betting player 3b. So, in order to determine whether the second and subsequent stacks 80 are bets by the main player 3m or back bets by the back-betting player 3b, the information processing device 12 may perform the determination as follows.

The camera 10 captures a plurality of images in succession and provides the information processing device 12 with a chronological picture 11. If other stacks 80 are bet within a predetermined time (e.g., within 2 seconds) after the first stack 80 is bet, the information processing device 12 determines that those stacks 80 are betting by the same player. By doing so, for example, even if there are three stacks 80 in the same betting area 6, the information processing device can determine whether the second stack 80 was bet by the main player 3m or by the back-betting player 3b.

Even if there are multiple stacks 80 in the same betting area 6, they may all have been bet by the main player 3m. In this case, if the second stack 80 was bet within a predetermined amount of time after the first stack 80 was bet, the information processing device 12 may recognize that the first stack and the second stack were bet by the same player, and if the third stack was bet within the predetermined amount of time after the second stack 80 was bet, the information processing device 12 may recognize that the second stack and the third stack were bet by the same player.

When there are multiple stacks 80 in the same betting area 6, the information processing device 12 may determine whether those stacks 80 were bet by the same player based on the amount and number of gaming chips 8 in the stack 80.

For example, if there is a stack 80 of ten $10,000 chips (for a total of $100,000) and a stack 80 of two $100 chips, it may be determined that those stacks were bet by separate players. This is because it is unlikely that a player who bets $100,000 would bet an additional $200 for a total of $100,200. In this case, the information processing device 12 may recognize the stack 80, which is the larger amount, as the stack on which the main player bet.

Figure 11:
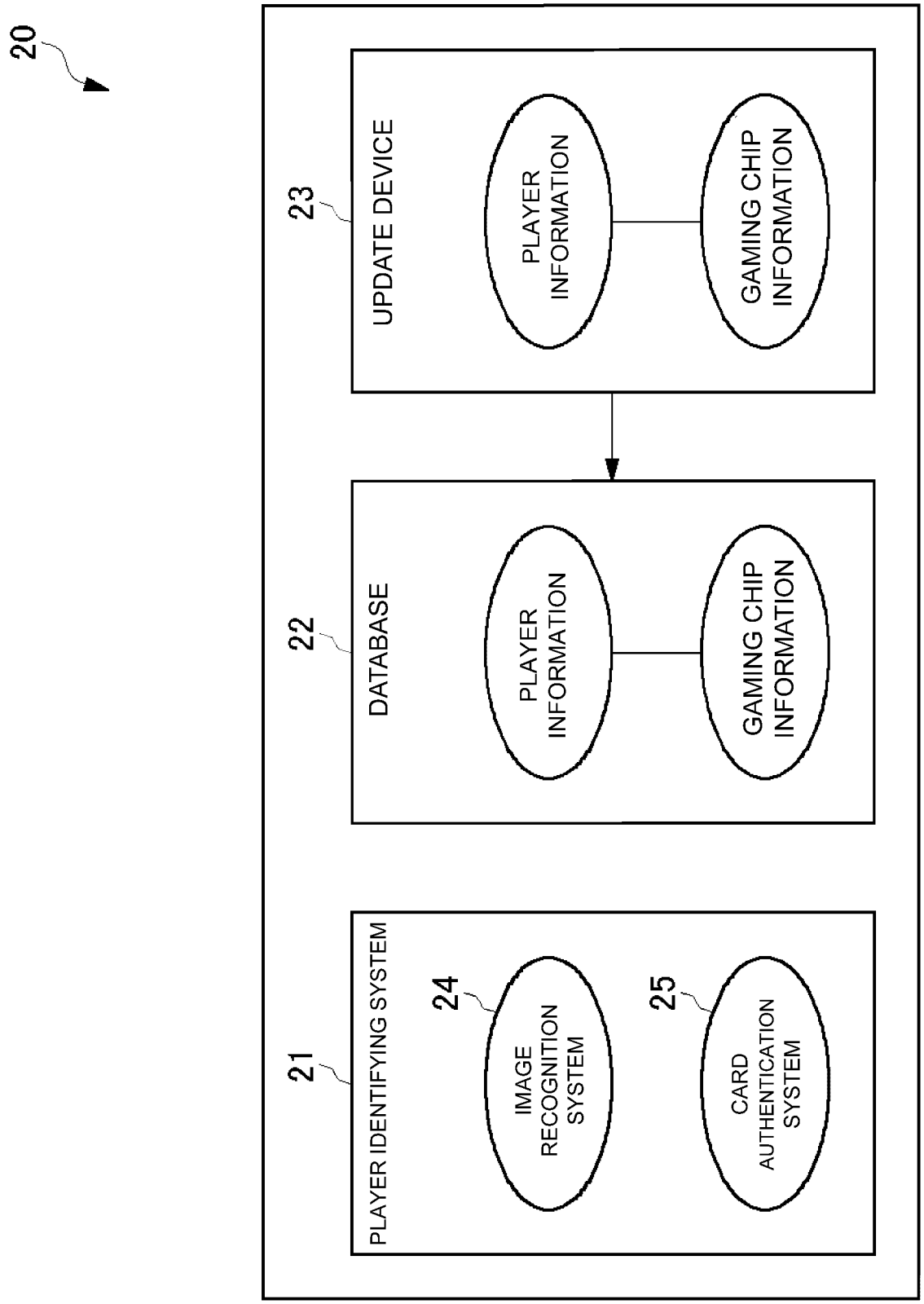
FIG. 11 is a diagram illustrating a configuration of a game system of a second example of the present disclosure.

FIG. 11 illustrates the configuration of the game system 20 of the second example of the present disclosure. The game system 20 of the second example comprises, in addition to the game system 1 of the first example (see FIG. 1), a player identification system 21 that identifies a main player 3m, a database 22 that stores information about the player 3 and the gaming chip 8 in association with each other, and an update device 23 that stores the information of the gaming chip 8 determined to be the stack 80 of the main player 3m and the information of the player 3 identified as the main player 3m in association with each other.

The above configuration makes it possible to manage at least the main player 3m's gaming chips 8 in the database 22. The player identification system 21 may also be configured to identify the back-betting player 3b.

The player identification system 21 includes an image recognition system 24 comprising a camera 10 and an image recognition device, and a card authentication system 25 comprising a card and a card reader, but it may include either one of the two.

The camera 10 captures the face of the player 3 and outputs the image generated by the capturing to the image recognition device. The image recognition device is equipped with a face recognition engine using a neural network which has learned the face images of a plurality of pre-registered players 3 (hereinafter, the registered players 3 are also referred to as "members"). The image recognition device identifies which registered member's face image the inputted face image is of by inputting the image from the camera 10 into the neural network. If the image from the camera 10 is determined that the image from the camera 10 is not a face of any of the registered members, the image recognition device outputs a result that the face image is a non-member's face image.

The camera 10 may capture a part of the body of the player 3 other than the face. For example, the camera may be configured to associate information on the clothing and/or physical features of the player 3 captured with information on the face of the player 3.

The card reader scans the member's card handed to the dealer by the player 3 and reads out the information stored on the member's card. The members' card is a magnetic card with a magnetic stripe, and at least the user ID of the player 3 (the member) is stored on the magnetic stripe. When the dealer receives the members card from the player 3, the dealer scans the members card with the card reader and inputs the position in which the player 3 will play (hereinafter referred to as "play position") to the card reader. The card reader outputs the user ID read from the member's card and the area ID of the play position entered by the dealer.

The structure may be configured to associate the information on the members' card with information on whether each player is the main player 3m or the back-betting player 3b.

In the player identification system 21, the player 3 may be identified either by the face recognition system or by reading the members' card, or only one of the two. That is to say, the registered members do not necessarily have to identified by the members card when they arrive at the play position, in which case the player 3 is identified by the face recognition system only. In addition, if the face of the player 3 cannot be captured properly and face recognition does not work, the player 3 may be identified by the members card. Furthermore, the player 3 may be identified by both the face recognition and the members card.

The information on the gaming chips 8 may be value or identification information or otherwise of the gaming chips 8. By using this information, it is also possible to determine which player 3 has been redeemed for how much gaming chip 8 and how much gaming chip 8 has been collected by the dealer, and how much gaming chip 8 each player 3 has in its possession as a result of those redemptions and collections (amount in possession).

The game system in the above description is assumed to be used in baccarat, but it may be used in blackjack as well.

By the above embodiments, the following is disclosed.

(Appendix 1) A game system comprising: a table having a betting area with multiple types of betting targets laid out; a camera that captures the table and generates a captured image; and an information processing device that identifies which betting target a stack of gaming chips in the captured image is being bet on, based on the position of the stack of gaming chips in the captured image, wherein the information processing device further determines which of a plurality of small areas set within the betting target the stack is located in.

(Appendix 2) A game system comprising: a table having a betting area with multiple types of betting targets laid out; a camera that captures the table and generates a captured image; and an information processing device that identifies which betting target a stack of gaming chips in the captured image is being bet on, based on the position of the stack of gaming chips in the captured image, wherein the information processing system has a map defining a betting target in a table coordinate system set on the table surface, and is configured to convert the position of the stack in the captured image to a position in the table coordinate system, and determine which betting target the stack is bet on by mapping the converted position onto the map.

EXPLANATION OF REFERENCE NUMERALS

1, Game system
2, Game table
3, PLAYER
3m, Main player
3b, Back-betting player
6, Betting area
7, Betting target
7a, PLAYER PAIR area
7b, BANKER PAIR area
7c, TIE area
7d, PLAYER WIN area
7e, BANKER WIN area
8, Gaming chip
80, Stack
10, Camera
11, Image
12, Information processing device
15, arm
15a, Main player's arm
15b, Back-betting player arm
20, Game system
21, Player identifying system
22, Database
23, Update device

The invention claimed is:

1. A game system comprising:
a table having at least one betting area, each of the at least one betting area including a plurality of betting targets on which bets can be placed;
a camera configured to capture a series of images of the table, wherein the series of images are captured in a chronological order; and
an information processing device configured to:
based on a position of one of a plurality of stacks of gaming chips that are in a same one of the at least one betting area represented in the series of images, identify on which of the betting targets the respective stack of gaming chips is being bet; and
determine which of the plurality of stacks of gaming chips in the series of images is a main player's stack of gaming chips and which of the plurality of stacks of gaming chips in the series of images is a back-betting player's stack of gaming chips based on a temporal order of timings in which the plurality of stacks of gaming chips were bet on the same betting area represented in the series of images.

2. The game system as claimed in claim 1, wherein the information processing device is further configured to determine which of the plurality of stacks of gaming chip is the main player's stack of gaming chips and which of the plurality of stacks of gaming chips is the back-betting player's stack of gaming chips based on a positional relationship of at least one of the plurality of stacks of gaming chips in the series of images.

3. The game system as claimed in claim 2, wherein the information processing device is configured to perform the determination of which of the plurality of stacks of gaming chips is the main player's stack of gaming chips and which of the plurality of stacks of gaming chips is the back-betting player's stack of gaming chips based on positional relationships of the plurality of stacks of gaming chips relative to each other.

4. The game system as claimed in claim 2, wherein the information processing device is configured to perform the determination of which of the plurality of stacks of gaming chips is the main player's stack of gaming chips and which of the plurality of stacks of gaming chips is the back-betting player's stack of gaming chips based on a positional relationship between the respective stacks and the betting target on which the stack is bet.

5. The game system as claimed in claim 1, wherein:
the camera is configured to capture one or more players betting the stacks of gaming chips; and
the information processing device is configured to recognize in the series of images each of the one or more players who has bet the plurality of stacks of gaming chips, and perform the determination of which of the plurality of stacks of gaming chips is the main player's stack of gaming chips and which of the plurality of stacks of gaming chips is the back-betting player's stack of gaming chips based on the recognition of each of the one or more players who has bet the plurality of stacks of gaming chips.

6. The game system as claimed in claim 5, wherein the information processing device is configured to recognize in the series of images a body part or clothing part of each of the one or more players who has bet the stack of gaming chips on the same betting area, and perform the determination of which of the plurality of stacks of gaming chips is the main player's stack of gaming chips and which of the plurality of stacks of gaming chips is the back-betting player's stack of gaming chips based on results of the recognition of the body part or clothing part.

7. The game system as claimed in claim 6, wherein the information processing device is configured to identify which body part or clothing part of the recognized body part or clothing part is a body part or clothing part of each of the main player and the back-betting player, and perform the determination of which of the plurality of stacks of gaming chips is the main player's stack of gaming chips and which of the plurality of stacks of gaming chips is the back-betting player's stack of gaming chips based on the identification.

8. The game system as claimed in claim 6, wherein the information processing device is configured to determine a direction of the recognized body part or clothing part, and perform the determination of which of the plurality of stacks of gaming chips is the main player's stack of gaming chips and which of the plurality of stacks of gaming chips is the back-betting player's stack of gaming chips based on the result of the determination of the direction.

9. The game system as claimed in claim 1, wherein the information processing device is configured to determine whether the plurality of stacks of gaming chips bet on the same betting area are stacks of gaming chips of a same player based on the series of images.

10. The game system as claimed in claim 9, wherein the information processing device is configured to determine whether the plurality of stacks of gaming chips are stacks of a same player based on a distance of the plurality of stacks of gaming chips from each other.

* * * * *